United States Patent
Yoshikawa et al.

(10) Patent No.: US 7,723,609 B2
(45) Date of Patent: *May 25, 2010

(54) TERMINAL BOX FOR SOLAR BATTERY MODULE

(75) Inventors: Hiroyuki Yoshikawa, Yokkaichi (JP); Makoto Higashikozono, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 191 days.

This patent is subject to a terminal disclaimer.

(21) Appl. No.: 11/992,978

(22) PCT Filed: Sep. 5, 2006

(86) PCT No.: PCT/JP2006/317507

§ 371 (c)(1),
(2), (4) Date: Apr. 2, 2008

(87) PCT Pub. No.: WO2007/052407

PCT Pub. Date: May 10, 2007

(65) Prior Publication Data

US 2009/0227126 A1      Sep. 10, 2009

(30) Foreign Application Priority Data

Nov. 1, 2005   (JP) .............................. 2005-318569

(51) Int. Cl.
    *H01L 31/05* (2006.01)
(52) U.S. Cl. ...................................................... 136/244
(58) Field of Classification Search ................. 439/500; 136/243–245, 251
See application file for complete search history.

(56) References Cited

U.S. PATENT DOCUMENTS

| | | | | |
|---|---|---|---|---|
| 6,696,636 | B2 * | 2/2004 | Yoshikawa et al. | 136/244 |
| 7,365,965 | B2 * | 4/2008 | Higashikozono et al. | 361/641 |
| 2004/0177987 | A1 | 9/2004 | Yoshikawa et al. | |
| 2005/0236031 | A1 * | 10/2005 | Higashikozono et al. | 136/251 |

FOREIGN PATENT DOCUMENTS

| | | |
|---|---|---|
| JP | 3498945 | 2/2004 |
| JP | 2004-214528 | 7/2004 |
| JP | 2005-150277 | 6/2005 |
| JP | 2005-236333 | 9/2005 |

* cited by examiner

Primary Examiner—Neil Abrams
Assistant Examiner—Phuong Nguyen
(74) Attorney, Agent, or Firm—Gerald E. Hespos; Michael J. Porco

(57) ABSTRACT

Three bypass diodes (50) each comprised of a principal body (51) with a rectifying function and a connecting piece extending from the principal body is bridged between corresponding two terminal plates (30A, 30B). The principal body (51) is supported by one terminal plate (30A, 30B), whereas the leading end of a connecting pin (52) is connected with the other terminal plate (30A, 30B). One of the bypass diode (50) has a polarity opposite to that of the remaining ones, and one of the terminal plates (30A, 30B) serves as an auxiliary intermediate terminal neither supporting the principal body (51) of the bypass diode (50) nor connected with a cable (90). Since both cable connecting terminals support the principal bodies (51) of the bypass diodes (50), heat generated by the principal bodies (51) can be efficiently radiated from the cable connecting terminals (30A) to the cables (90).

6 Claims, 2 Drawing Sheets

TERMINAL BOX FOR SOLAR BATTERY MODULE

BACKGROUND OF THE INVENTION

1. Field of the Invention

The present invention relates to a terminal box for solar battery module.

2. Description of the Related Art

A solar photovoltaic system is so constructed as to supply direct currents from a solar battery panel laid on the roof of a house or building to electrical goods via an inverter or the like. The solar battery panel is comprised of a plurality of solar battery modules, and electrodes of the respective solar battery modules are connected in series or in parallel via terminal boxes.

A known terminal box is such that a pair of terminal plates are juxtaposed on a base plate forming the bottom of a box main body, a plus electrode and a minus electrode drawn from the underside of the solar battery module are connected with one ends of the both terminal plates, and ends of cables for external connection are connected with the other ends of the both terminal plates (see, for example, Japanese Patent No. 3498945). A bypass diode for reverse flow/short circuit bridges the two terminal plates. This bypass diode is constructed such that two conductive pieces extend in opposite directions with a bare chip interposed therebetween and the extending ends thereof are connected with the corresponding terminal plates by soldering.

In the above case, heat generated by the bare chip is transferred to the two terminal plates from the two conductive pieces and radiated to the cables. Accordingly, heat conduction paths to the cables are elongated by as much as they extend via the two conductive pieces, wherefore heat conductivity is likely to decrease. Therefore, there is a likelihood that heat remains in the bare chip to cause a problem in a rectifying function.

The present invention was completed in view of the above situation and an object thereof is to ensure good heat conductivity to cables.

SUMMARY OF THE INVENTION

The invention is directed to a terminal box for solar battery module, comprising: a box main body accommodating at least three terminal plates arranged side by side inside, cable connecting terminals, which are two of the respective terminal plates and connected with cables for extracting electromotive forces from a solar battery module, intermediate connecting terminal(s) formed by the remaining one(s) of the respective terminal plates excluding the cable connecting terminals, and at least two bypass rectifying elements at the time of a reverse load, each including a principal body with a rectifying function based on a PN junction and supported on one of the two adjacent terminal plates, and a connecting piece connected with the principal body and extending toward the other terminal plate to bridge the two terminal plates, wherein at least one of the respective rectifying elements has a polarity opposite to that of the remaining rectifying element(s) and one of the intermediate connecting terminals serves as an auxiliary intermediate terminal supporting no principal body of the rectifying element, whereby each of the both cable connecting terminals supports the principal body of the rectifying element.

The present invention is preferably embodied to have the following constructions.

(1) Each of the both cable connecting terminals is formed with a connection hole, into which the principal body of the rectifying element is pressed to be held. According to this construction, heat generated by the principal bodies of the rectifying elements can be more quickly transferred to the cable connecting terminals without via solder layers or the like.

(2) Each of the both cable connecting terminals is set to have a larger total area than the auxiliary intermediate terminal. According to this construction, larger areas taken up by the both cable connecting terminals can be ensured in the box main body, whereby a heat radiating property from the cable connecting terminals can be improved.

(3) The respective terminal plates are placed on a base plate of the box main body and accommodated in the box main body with an insulating resin filled on the upper surfaces of the terminal plates, and partition walls for partitioning areas where the respective terminal plates are to be placed stand on the base plate. According to this construction, a filled amount of the insulating resin can be saved by as much as an amount corresponding to the thicknesses of the partition walls.

(4) The respective terminal plates are placed on a base plate of the box main body, an opening is formed at an end position of the base plate, and connecting portions of the terminal plates connected with leads from the solar battery module are located in the opening. This construction is convenient in the case where the leads of the solar battery module are connected with the connecting portions of the terminal plates by soldering.

(5) The respective terminal plates are placed by being pressed against a base plate of the box main body and include an intermediate connecting terminal supporting the principal body of the rectifying element, and this intermediate connecting terminal is cut to form a slit-shaped heat insulating layer making an opening in one lateral edge thereof. According to this construction, heat generated by the principal bodies of the rectifying elements can be efficiently radiated to the base plate while being transferred in the intermediate connecting terminal via the heat insulating layer.

According to the present invention, one of the rectifying elements has the polarity opposite to that of the remaining ones, and one of the terminal plates serves as the auxiliary intermediate terminal supporting no principal body of the rectifying element, whereby each of the both cable connecting terminals supports the principal body of the rectifying element. Thus, heat generated by the principal bodies of the rectifying elements can be directly transferred to the both cable connecting terminals and efficiently radiated from the cable connecting terminals to the cables.

DETAILED DESCRIPTION OF THE PREFERRED EMBODIMENTS

Figure 1:
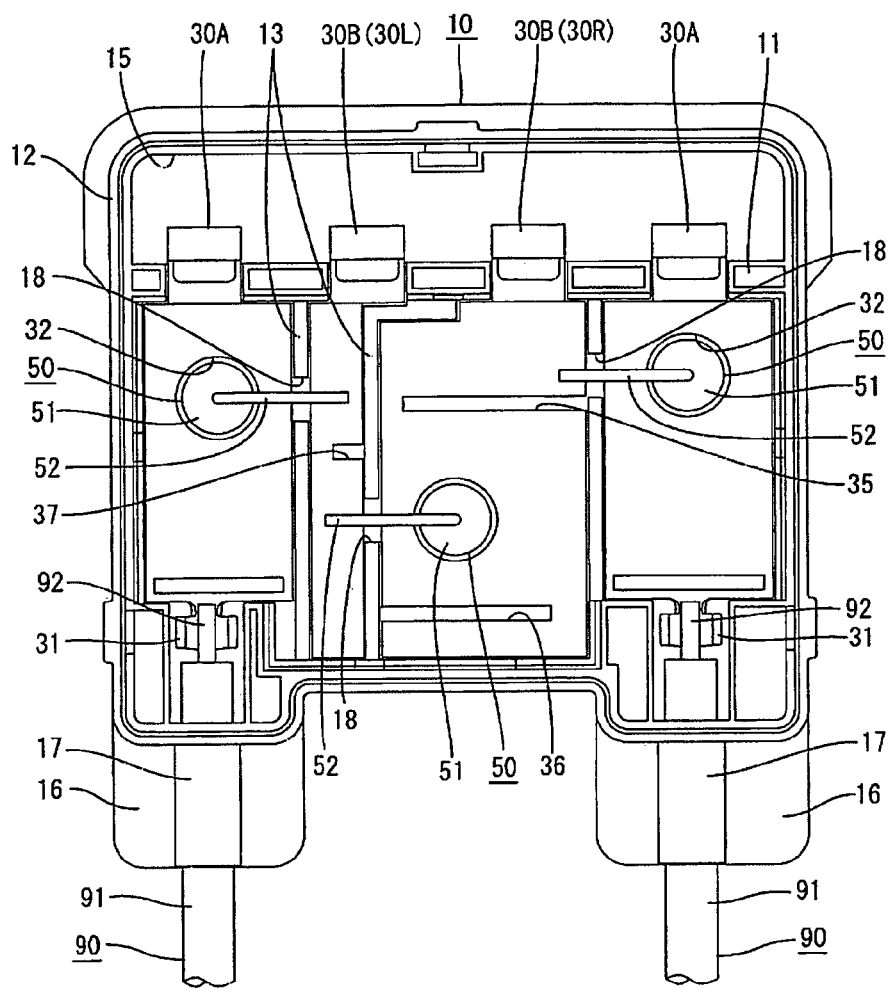
FIG. 1 is a plan view of the interior of a box main body of a terminal box for solar battery module according to one embodiment of the invention.
Figure 2:
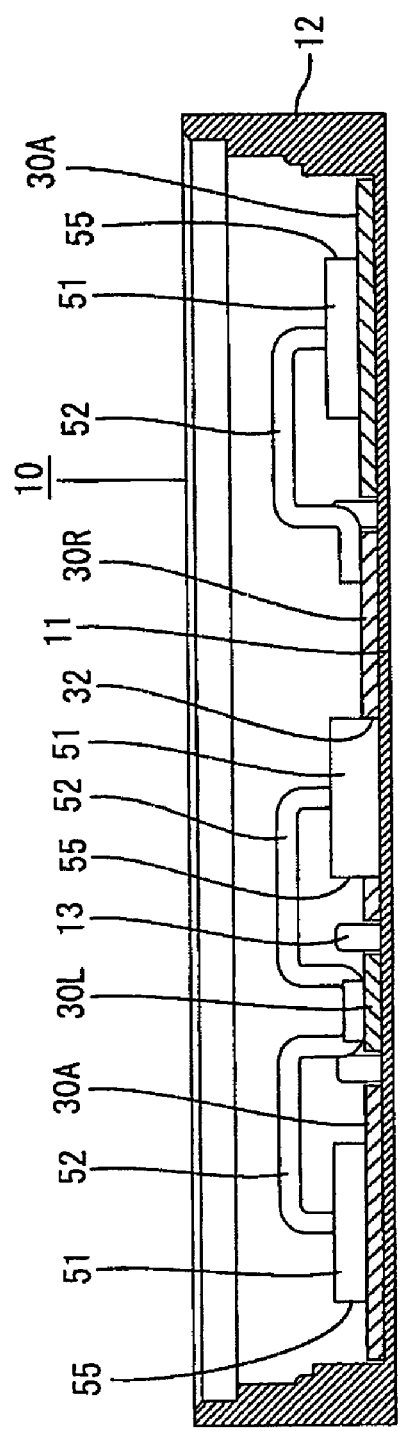
FIG. 2 is a section of the interior of the box main body.

One embodiment of the invention is described with reference to FIGS. 1 and 2. A terminal box for solar battery module of this embodiment is mounted on the underside of a solar battery module having a multitude of solar battery cells connected with each other in series, and provided with a boxshaped box main body 10, a multitude of terminal plates 30A, 30B arranged in parallel in this box main body 10 and a plurality of bypass diodes 50 (corresponding to "bypass rectifying elements at the time of a reverse load" of the present invention) bridging the adjacent terminal plates 30A, 30B.

The box main body 10 is made of a synthetic resin and has a box shape with an open upper side. An insulating resin material (potting material) is introduced into the box main body 10 and an unillustrated cover is mounted from above. More specifically, as shown in FIG. 1, the box main body 10 includes a substantially rectangular base plate 11 on which a plurality of terminal plates 30A, 30B are placed side by side with almost no clearances defined therebetween, a side plate 12 standing up from the peripheral edge of the base plate 11 to surround, and partition walls 13 standing up at specified positions on the base plate 11 to partition between the adjacent terminal plates 30A, 30B. Out of the box main body 10, an insulating resin is so filled into spaces partitioned by the partition walls 13 as to adhere to the respective terminal plates 30A, 30B, and a filled amount of the insulating resin can be reduced by as much as an amount corresponding to the thicknesses of the partition walls 13.

An opening 15 is formed to extend over the entire width at one end of the base plate 11, and the leading ends of the respective terminal plates 30A, 30B are located in this opening 15. Unillustrated leads corresponding to the respective solar battery cell groups are introduced through the opening 15 of the base plate 11, and the respective introduced leads can be connected with the leading ends of the corresponding terminal plates 30A, 30B, for example, by soldering.

At the opposite widthwise ends of the other end of the base plate 11, cable placing portions 16, on which cables 90 for external output are to be placed, are formed to extend in longitudinal direction. Tubular portions 17 formed with cable insertion holes (not shown), through which the cables 90 can be loosely passed, are so placed on the cable placing portions 16 as to extend in longitudinal direction.

The terminal plates 30A, 30B are formed into strips by, for example, cutting an electrically conductive metal plate material, and four terminal plates are arranged side by side along the outer surface (top surface) of the base plate 11. Out of the respective terminal plates 30A, 30B, two located at the opposite ends in an arranging direction serve as cable connecting terminals 30A to be crimped into connection with the cables 90 for extracting electromotive forces from the respective solar battery cell groups. An insulation coating 91 is stripped off at an end of each cable 90 to expose a core 92, and a pair of barrel portions 31 formed at an end of the cable connecting terminal 30A are crimped or soldered into connection with the exposed core 92. An intermediate area of each cable connecting terminal 30A is formed wider than the connection area with the lead and the barrel portions 31, and a principal body 51 of the bypass diode 50 is supported in this intermediate area. A connection hole 32, into which the principal body 51 of the bypass diode 50 is fitted for connection, is formed to penetrate the intermediate area of the cable connecting terminal 30A. By forming this intermediate area wider, a heat radiating property at the time of heat generation of the bypass diode 50 is improved.

Out of the respective terminal plates 30A, 30B, two located in the middle in the arranging direction serve as intermediate connecting terminals 30B arranged between the two cable connecting terminals 30A. Out of these intermediate connecting terminals 30B, one intermediate connecting terminal 30R (shown right terminal plate 30B) supports the principal body 51 of the bypass diode 50 and the other intermediate connecting terminal 30L (shown left terminal plate 30B) supports no principal body 51 and is connected with the leading ends of connecting pins 52 (corresponding to "connecting pieces" of the present invention) extending from the principal bodies 51 supported by the terminal plates located at the opposite sides (cable connecting terminal 30A and one intermediate connecting terminal 30R). A connection hole 32, into which the principal body 51 is fitted for connection, is likewise formed to penetrate the one intermediate connecting terminal 30R supporting the principal body 51, and the intermediate area of this intermediate connecting terminal 30R is formed wider than the other intermediate connecting terminal 30L in order to improve the heat radiating property. The other intermediate connecting terminal 30L is set to have the smallest total area among the four terminal plates 30A, 30B, wherefore the other terminal plates 30A, 30R take up larger areas in the box main body 10.

The intermediate area of the one intermediate connecting terminal 30R is formed to project toward the other intermediate connecting terminal 30L and, accordingly, the intermediate area of the other intermediate connecting terminal 30L is displaced in width direction from the connection area with the lead to have a stepped shape. The respective terminal plates 30A, 30B are partitioned by the partition walls 13. The partition wall 13 arranged between the one intermediate connecting terminal 30R and the other intermediate connecting terminal 30L is bent along the projecting part of the one intermediate connecting terminal 30R. Each partition wall 13 is formed with a cutout 18, through which the connecting pin 52 of the bypass diode 50 passes, so as to be able to avoid the interference with the connecting pin 52.

The principal bodies 51 of the three bypass diodes 50 supported by the two cable connecting terminals 30A and the one intermediate connecting terminal 30R are displaced from positions on a straight line extending in the arranging direction of the respective terminal plates 30A, 30B. The intermediate connecting terminals 30B are formed with heat insulating portions 35, 36, 37 for dividing heat radiating areas of the respective bypass diodes 50 into a plurality of areas. Each of these heat insulating portions 35, 36, 37 is a slit-shaped air layer extending in width direction and making an opening in one lateral edge of the intermediate connecting terminal 30B. Two heat insulating portions are formed in the one intermediate connecting terminal 30R, and one is formed in the other intermediate connecting terminal 30L. Specifically, the one intermediate connecting terminal 30R is cut at a position near the opening 15 to form a first heat insulating layer 35 having such a depth as to make an opening in the right edge and reach a position in the vicinity of the left edge, and a second insulating layer 36 having such a depth as to make an opening in the left edge and reach a position in the vicinity of the right edge is formed at a position at a side of the bypass diode 50 opposite to the first insulating layer 35. Further, the other intermediate connecting terminal 30L is cut between the leading ends of the two placed and connected connecting pins 52 to form a third heat insulating layer 37 having such a depth as to make an opening in the right edge and reach a substantially middle part with respect to width direction. Heat generated by the bypass diodes 50 is efficiently radiated from the corresponding terminal plates 30A, 30B to the base plate 11 while going by way of these heat insulating layers 35, 36, 37.

The bypass diode 50 roughly includes the principal body 51 having a flat cylindrical shape and the bendable connecting pin 52 drawn out from the substantial center of one end surface of the principal body 51. The principal body 51 is such that a lateral side of an unillustrated chip diode comprised of a P-area (anode area) and an N-area (cathode area) is surrounded by a metallic cylindrical member 55 and a bottom portion (either the anode area or the cathode area) of the chip diode is held in contact with a bottom portion of the cylindrical member 55 to establish an electrical connection while an insulating resin is filled between the cylindrical member 55 excluding this bottom portion and the chip diode, wherefore the principal body 51 is formed into a small-size package as a whole. A multitude of unillustrated sawtooth-shaped recesses and projections are formed in longitudinal direction in the circumferential surface of the principal body 51 (circumferential surface facing the cylindrical member) and bite in the edge of the connection hole 32 of the terminal plate 30A, 30B, whereby the bypass diode 50 can be easily and reliably supported in the corresponding terminal plate 30A, 30R while being prevented from rotating.

The connecting pin 52 of the bypass diode 50 is electrically connected with the top surface (either the cathode area or the anode area) of the chip diode while the base end thereof is embedded in the principal body 51. Specifically, the connecting pin 52 is arranged to bridge the terminal plate 30A, 30R supporting the principal body 51 and the adjacent terminal plate 30B, is bent on the top surface of the chip diode to extent substantially horizontally toward the adjacent terminal plate 30B and then bent downward, has the bottom end thereof further bent to extend along the upper surface of the adjacent terminal plate 30B, and has resistance welding or soldering welding applied to the leading end thereof to be connected with this adjacent terminal plate 30B.

In this embodiment, one principal body 51 of the bypass diode 50 is supported on each of the two cable connecting terminals 30A and one principal body 51 of the bypass diode 50 is supported on the one intermediate connecting terminal 30R as described above. Out of these bypass diodes 50, one bypass diode 50 is formed such that the P-side (anode side) and the N-side (cathode side) have polarities opposite to those of the two remaining bypass diode 50. More specifically, the connecting pin 52 of the bypass diode 50 bridging the cable connecting terminal 30A arranged at the left side and the other intermediate connecting terminal 30L is drawn out from the N-side (cathode side) of the principal body 51 supported on this cable connecting terminal 30A to have a N-polarity. The connecting pin 52 of the bypass diode 50 bridging the cable connecting terminal 30A arranged at the right side and the one intermediate connecting terminal 30R is drawn out from the P-side (anode side) of the principal body 51 supported on this cable connecting terminal 30A to have a P-polarity, and the connecting pin 52 of the bypass diode 50 bridging the one intermediate connecting terminal 30R and the other intermediate connecting terminal 30L is drawn out from the P-side (anode side) of the principal body 51 supported on the one intermediate connecting terminal 30R to have a P-polarity. Accordingly, by using the other intermediate connecting terminal 30L as an auxiliary intermediate terminal to be connected with the leading ends of the two connecting pins 52, the principal bodies 51 of the bypass diodes 50 can be supported on the both cable connecting terminals 30A while the bypass diodes 50 are connected in series.

Next, functions and effects of this embodiment are described. First of all, the principal bodies 51 of the bypass diodes 50 are pressed into the respective connection holes 32 of the both cable connecting terminals 30A and the one intermediate connecting terminal 30R, and the leading ends of the connecting pins 52 are placed on the adjacent terminal plates 30B (other intermediate connecting terminal 30L and one intermediate connecting terminal 30R) and connected by resistance welding or soldering welding.

Subsequently, the cables 90 for external output are inserted through the cable introducing holes of the tubular portions 17 on the cable placing portions 16, the cores 92 of the cable connecting terminals 30A located in the box main body 10 after passing through the tubular portion 17 are placed on the barrel portions 31 of the cable connecting terminals 30A, and the barrel portions 31 of the cable connecting terminals 30A are crimped or soldered into connection with the cores 92 of these cables 90.

Thereafter, the base plate 11 of the box main body 10 is fixed to the solar battery module by means of adhesive, double-sided adhesive tape or bolts. In the mounting process, the leads connected with the electrodes of the solar battery module are drawn through the opening 15 of the base plate 11 and the leading ends of the leads are soldered into connection with the leading ends of the corresponding terminal plates 30A, 30B. Subsequently, the insulating resin such as a silicon resin is filled into the box main body 10 to seal the connected parts with the bypass diodes 50, the terminal plates 30A, 30B, the leads and the cables 90 airtight. Finally, the cover is mounted to close the opening in the upper surface of the box main body 10, thereby completing the assembling operation.

As described above, according to this embodiment, one of the three bypass diodes 50 has the polarity opposite to that of the remaining bypass diodes 50 and the other intermediate connecting terminal 30L is used as the auxiliary intermediate terminal supporting no principal body 51 of the bypass diode 50, whereby the both cable connecting terminals 30A support the principal bodies 51 of the bypass diodes 50. Thus, heat generated by the principal bodies 51 of the bypass diodes 50 can be directly and quickly transferred to the both cable connecting terminals 30A and can be efficiently radiated from the cable connecting terminals 30A to the cables 90 (specifically the cores 92 of the cables 90).

Further, since the principal bodies 51 of the bypass diode 50 are pressed into the connection holes 32 of the both cable connecting terminals 30A to be held, the heat generated by the principal bodies 51 of the bypass diodes 50 can be more quickly transferred to the cable connecting terminals 30A without via solder layers or the like.

Since the both cable connecting terminals 30A are set to have the larger total areas than at least the other intermediate connecting terminal 30L, large areas to be taken up by the both cable connecting terminals 30A can be ensured in the box main body 10 and the heat radiating property from the cable connecting terminals 30A can be improved.

The present invention is not limited to the above described and illustrated embodiment. For example, the following embodiments are also embraced by the technical scope of the present invention as defined by the claims. Beside the following embodiments, various changes can be made without departing from the scope and spirit of the present invention as defined by the claims.

(1) According to the present invention, a known package diode or a bare chip diode comprised of a bare chip and a conductive piece may be used as the bypass diode. In this case, the principal bodies with the rectifying function based on the PN junction may be supported, for example, by being placed on the both cable connecting terminals.

(2) According to the present invention, the intermediate connecting terminal may be formed by one auxiliary intermediate terminal or may be formed by one auxiliary intermediate terminal and two or more intermediate connecting terminals supporting the principal body of the bypass diode.

What is claimed is:

1. A terminal box for solar battery module, comprising:
a box main body accommodating at least three terminal plates arranged side by side inside,
cable connecting terminals, which are two of the respective terminal plates and connected with cables for extracting electromotive forces from a solar battery module,
intermediate connecting terminal(s) formed by the remaining one(s) of the respective terminal plates excluding the cable connecting terminals, and
at least two bypass rectifying elements at the time of a reverse load, each including a principal body with a rectifying function based on a cathode and anode junction and supported on one of the two adjacent terminal plates, and a connecting piece connected with the principal body and extending toward the other terminal plate to bridge the two terminal plates,
wherein at least one of the respective rectifying elements has a polarity opposite to that of the remaining rectifying element(s) and one of the intermediate connecting terminals serves as an auxiliary intermediate terminal supporting no principal body of the rectifying element, whereby each of the both cable connecting terminals supports the principal body of the rectifying element.

2. A terminal box for solar battery module according to claim 1, wherein each of the both cable connecting terminals is formed with a connection hole, into which the principal body of the rectifying element is pressed to be held.

3. A terminal box for solar battery module according to claim 1 or 2, wherein each of the both cable connecting terminals is set to have a larger total area than the auxiliary intermediate terminal.

4. A terminal box for solar battery module according to claim 1, wherein:
the respective terminal plates are placed on a base plate of the box main body and accommodated in the box main body with an insulating resin filled on the upper surfaces of the terminal plates, and
partition walls for partitioning areas where the respective terminal plates are to be placed stand on the base plate.

5. A terminal box for solar battery module according to claim 1, wherein:
the respective terminal plates are placed on a base plate of the box main body,
an opening is formed at an end position of the base plate, and
connecting portions of the terminal plates connected with leads from the solar battery module are located in the opening.

6. A terminal box for solar battery module according to claim 1, wherein:
the respective terminal plates are placed by being pressed against a base plate of the box main body and include an intermediate connecting terminal supporting the principal body of the rectifying element, and
this intermediate connecting terminal is cut to form a slit-shaped heat insulating layer making an opening in one lateral edge thereof.

* * * * *